July 14, 1931.  G. W. SWIFT, JR  1,814,867
BLANK SLITTING AND SLOTTING MACHINE
Filed March 18, 1930   5 Sheets-Sheet 1
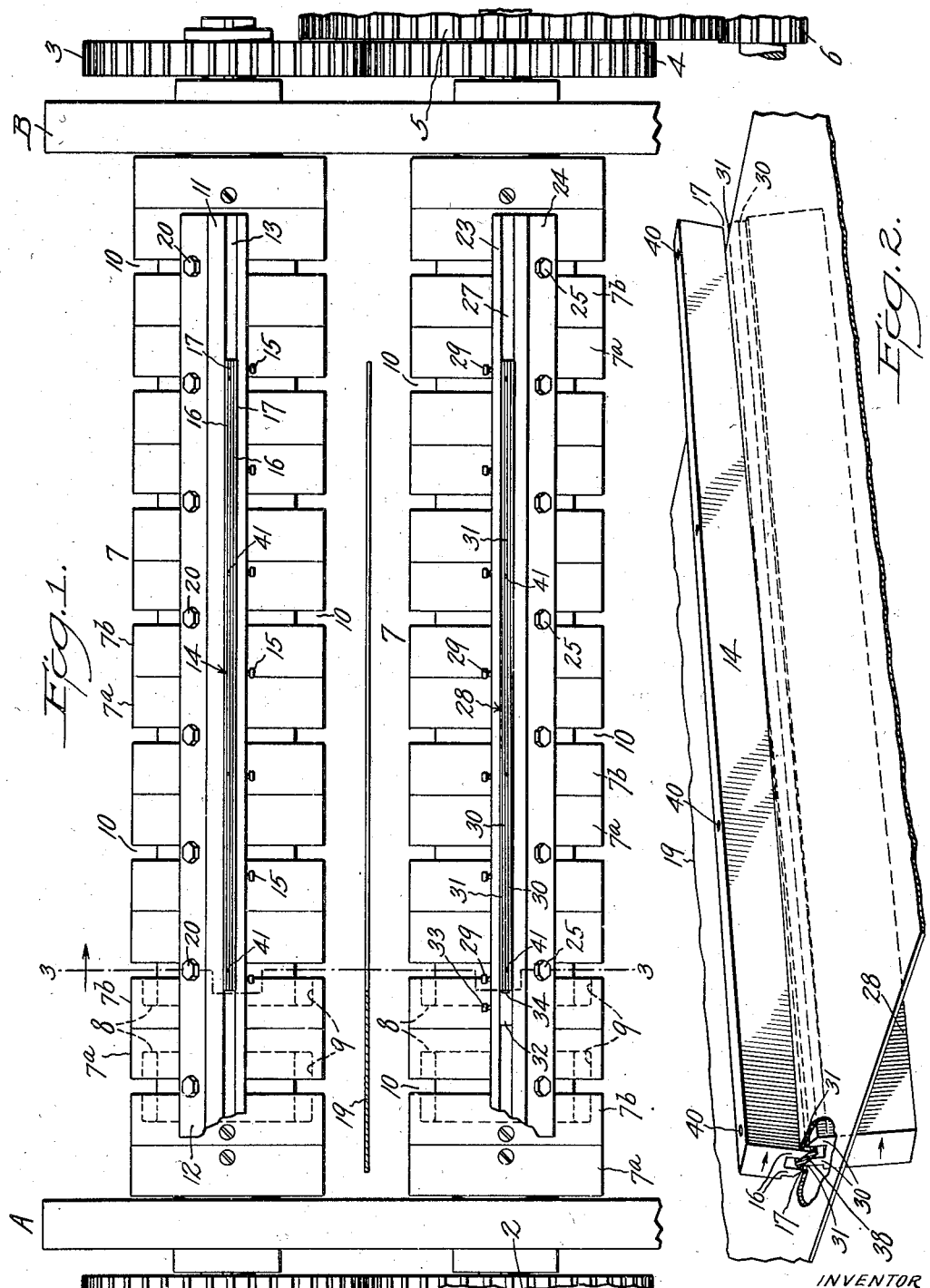
INVENTOR
GEORGE W. SWIFT, JR.

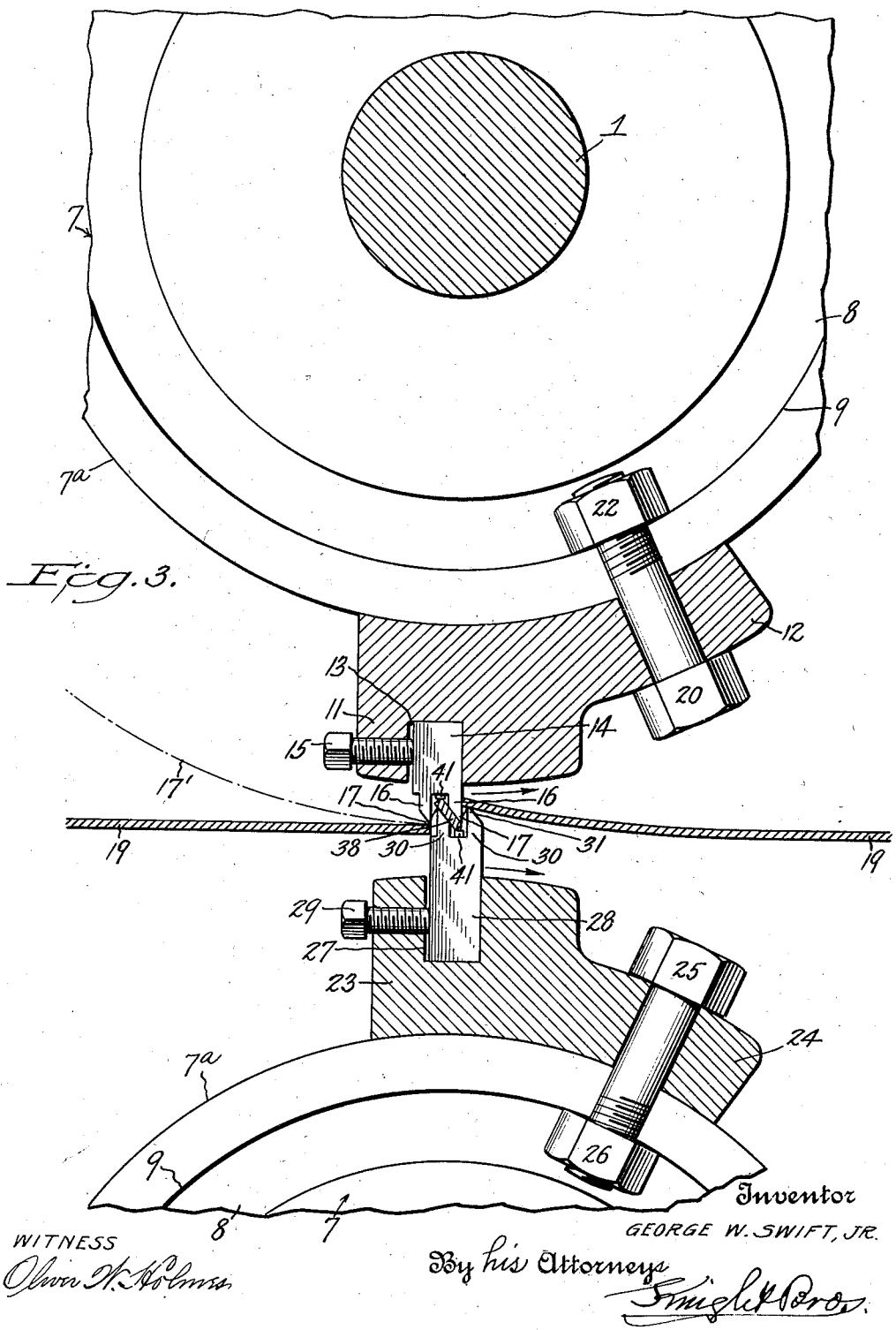

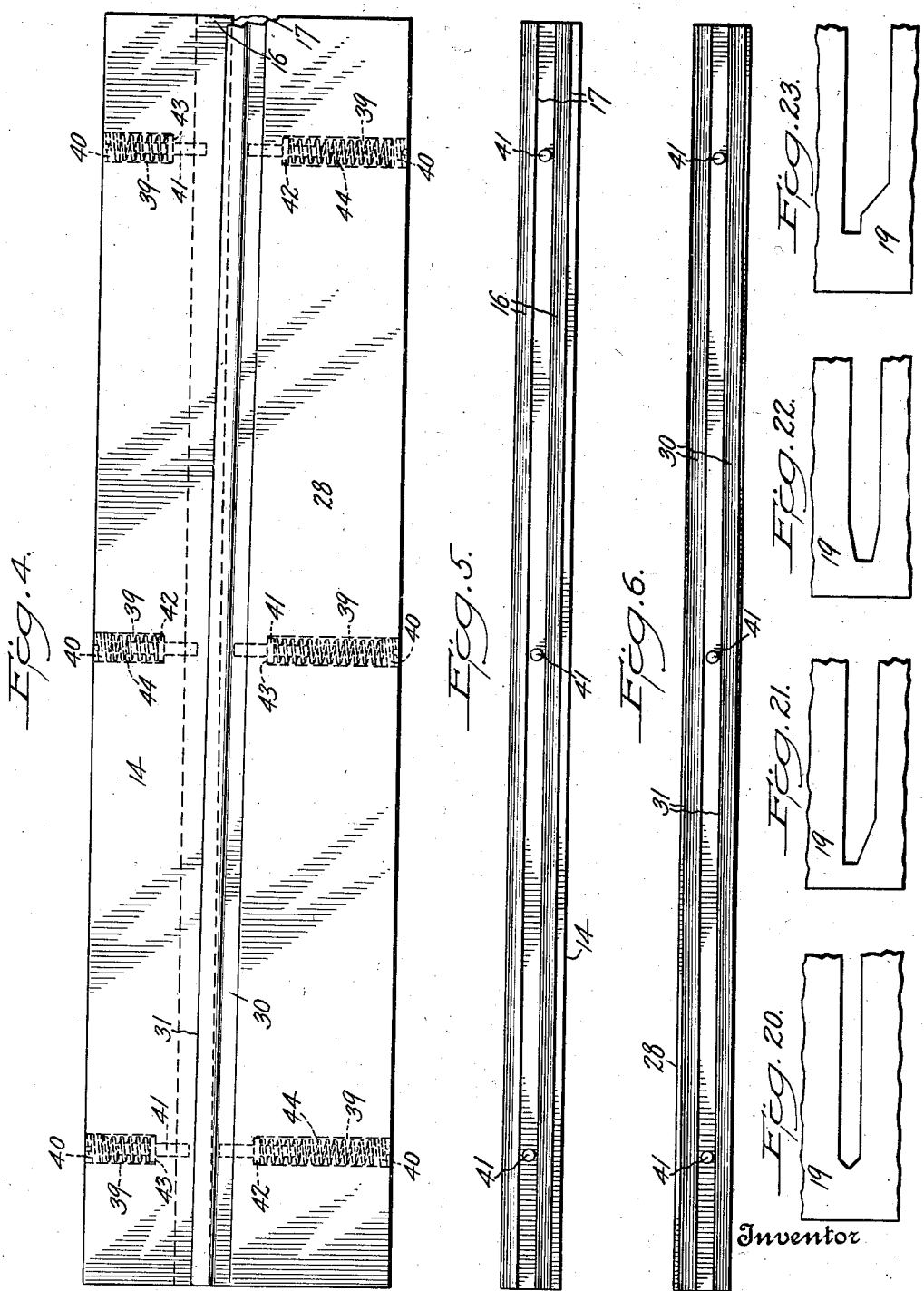

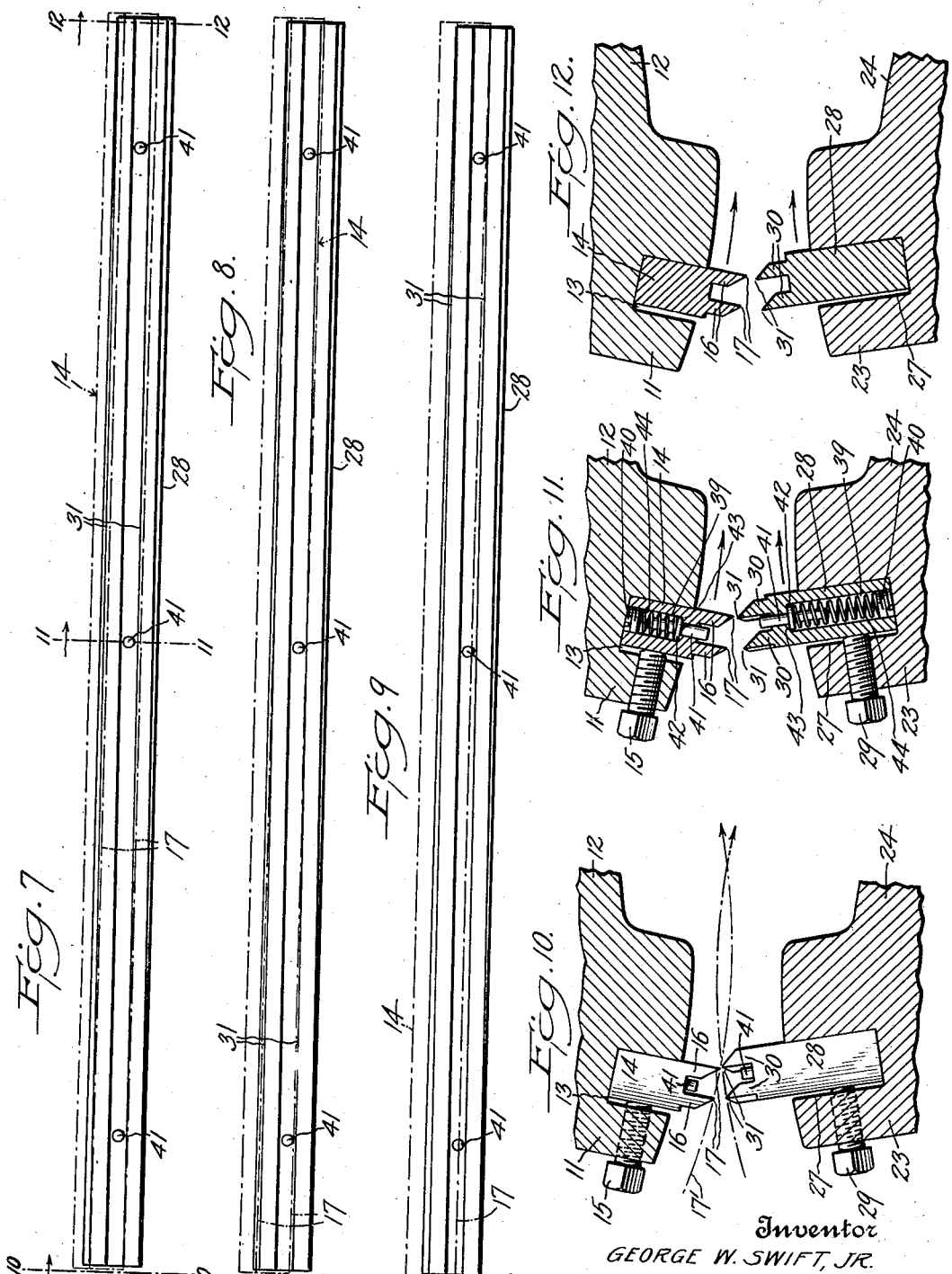

July 14, 1931.  G. W. SWIFT, JR  1,814,867
BLANK SLITTING AND SLOTTING MACHINE
Filed March 18, 1930  5 Sheets-Sheet 5
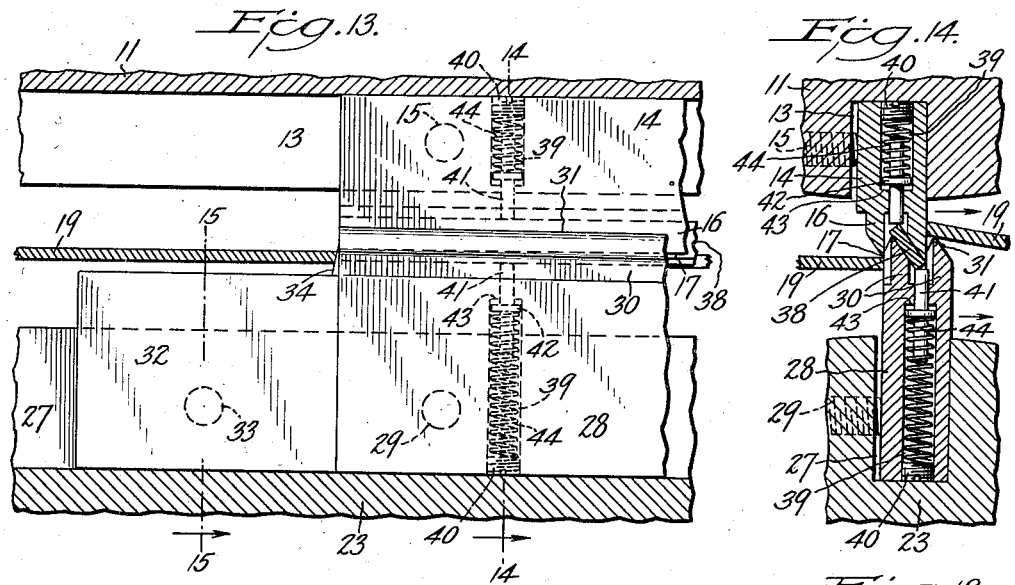
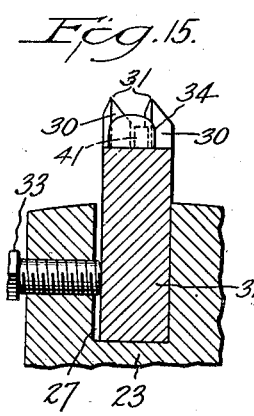
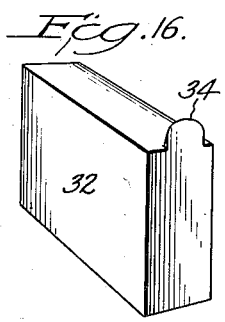
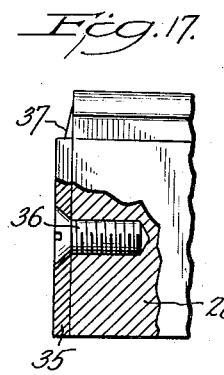
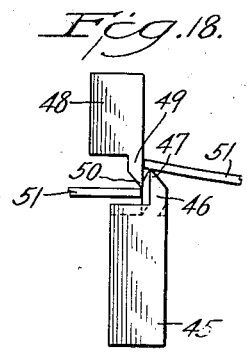
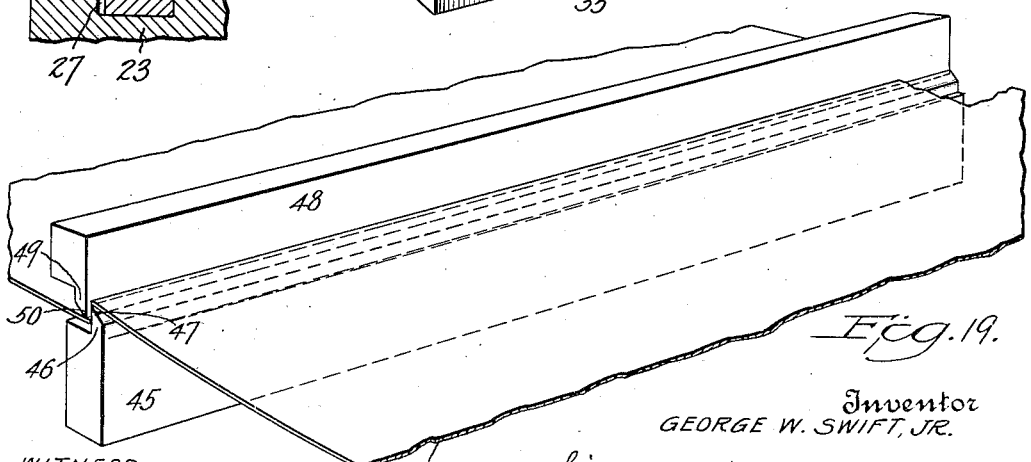
Inventor
GEORGE W. SWIFT, JR.
By his Attorneys
WITNESS Patented July 14, 1931

1,814,867

UNITED STATES PATENT OFFICE

GEORGE W. SWIFT, JR., OF BORDENTOWN, NEW JERSEY, ASSIGNOR TO GEORGE W. SWIFT, JR., INC., OF BORDENTOWN, NEW JERSEY, A CORPORATION OF NEW JERSEY

BLANK SLITTING AND SLOTTING MACHINE

Application filed March 18, 1930. Serial No. 436,768.

This invention relates more especially to blank-slitting and slotting machines of the rotary type and has for its primary object to provide a slitting or slotting blade of improved construction for machines of this character and an improved arrangement of said blade with respect to its axis of revolution and with respect to another slitting or slotting blade which is revolvable about another axis and co-operates therewith for cutting slits or slots in a blank which is fed to said blades for this purpose.

The main purpose of my invention is to provide better clearance and more effective cooperation between two revolving blades which operate progressively along predetermined lines.

One of the objects of the present invention is to provide an improved construction and relative arrangement of revolving slitting or slotting blades whereby a progressive transverse cut may be made in a continuously moving blank with little or no interference between the cutting blades and the forwardly moving blank and without injury to the material of which the blank is made. Towards the attainment of this object, my invention contemplates cooperative action between a relatively slow-moving blade traveling over a correspondingly shortened path and a relatively rapid-moving blade traveling over a correspondingly lengthened arc, the relative difference in the movements of these blades being compensated for by their relative forms and arrangement with respect to each other and with respect to their respective axes of revolution.

Other and further objects of my invention will be understood from the features of construction and arrangement recited in the claims and described in the specification in connection with the accompanying drawings which show preferred embodiments of the invention.

In the drawings:—

Figure 1 is a front elevation of a blank slotting mechanism constructed in accordance with the principles of the present invention, parts being broken away.

Figure 2 is a perspective view of the slot-cutting knives detached, said knives being shown in their relative positions at the half-way point of a slot-cutting operation, a portion of the blank being broken away at the nearer end of the knives for the purpose of showing the relations of the parts to better advantage.

Figure 3 is a fragmentary cross-section of the slotting mechanism on an enlarged scale at the end of the slot-cutting operation, said section being taken in a broken plane corresponding to the line 3—3 of Figure 1.

Figure 4 is a front elevation of the slotting cutters at the end of the slot-cutting operation.

Figure 5 is a bottom plan view of the upper cutter removed.

Figure 6 is a top plan view of the lower cutter removed.

Figure 7 is a top plan view of the lower cutter blade the relative position of the upper cutter blade at the beginning of the slot-cutting operation being indicated thereon in dot and dash lines.

Figure 8 is a similar view showing the relative positions of the lower and upper cutter blades at the middle of the slot-cutting operation.

Figure 9 is a similar view showing the relative positions of the cutter blades at the end of the slot-cutting operation.

Figure 10 is an enlarged end elevation of the slot-cutting blades taken from the line 10—10 of Figure 7, contiguous portions of the blade-supports being shown in cross-section.

Figure 11 is a cross-section on an enlarged scale on the line 11—11 of Figure 7.

Figure 12 is a similar enlarged cross-section on the line 12—12 of Figure 7.

Figure 13 is a fragmentary front elevation of one end of the cooperating cutter blades in the relative positions shown in Figure 4, said blades being shown in connection with the end slotting-cutter according to one embodiment of my invention.

Figure 14 is a cross-section on the line 14—14 of Figure 13.

Figure 15 is a section on the line 15—15 of Figure 13.

Figure 16 is a perspective view of the end slot-cutter removed.

Figure 17 is a fragmentary side elevation of one end of a bottom cutter, showing a modified form of the end slot-cutter attached thereto, parts being broken away and parts shown in section.

Figure 18 is an end elevation of a single pair of cooperating knives constructed according to the present invention, said knives being shown in their relative positions at the end of the cutting stroke.

Figure 19 is a perspective view of the parts shown in Figure 18.

Figures 20 to 23 inclusive show different forms of the slots which may be cut in blanks by means of the slot-cutting mechanism shown and described.

Referring more especially to the embodiments of my invention shown on the drawings, upper and lower shafts 1 and 2 are journalled in laterally-spaced side frames A and B as shown in Figure 1, and are geared together by means of upper and lower spur gears 3 and 4 which are keyed to said shafts. Keyed to the lower shaft 2 is another spur gear 5 which is driven by a pinion 6. Keyed to the upper and lower shafts 1 and 2 are two blade-carrying cylinders 7, each of said cylinders comprising a plurality of coaxially-arranged sections 7a and 7b provided with central web portions 8 and undercut peripheral flanges 9. Said sections 7a and 7b are suitably formed and mounted upon said shafts 1 and 2 to provide interposed slots 10. Mounted upon the periphery of the upper cylinder is a slotting blade-support 11 provided with an attachment flange 12, said support and flange extending lengthwise of and parallel to the axis of said cylinder. As shown best in Figure 3 of the drawings, said blade-support 11 is provided with a longitudinal slot 13 for the reception of a cutter-bar 14, which may be secured in position by screws or bolts 15. The cutter-bar 14 is provided with outwardly-presented cutter-blades 16 which are peripherally-spaced with respect to a cylindrical pitch-surface 17' having a radius shorter than the radial distance of the rotary axis of upper shaft 1 and the feeding plane of a blank 19 in which suitable slits or slots are to be cut. The cylindrical pitch-surface 17' may be considered as a surface of revolution generated by the cutting edges 17 of the blades 16, said cutting edges being parallel to each other and to the rotary axis of upper shaft 1. The blade-holder 11 may be secured in any adjusted position around the periphery of the upper cylinder 7 by means of axially-spaced bolts 20 which pass through the flange 12 as well as through the peripheral slots 10, said bolts being secured at their inner ends by nuts 22 around and within the peripheral flanges 9. Mounted upon the lower cylinder is a blade or cutter-bar support 23 provided with an attachment flange 24 by means of which said blade-holder or support is secured to the peripheral flanges 9 of said lower cylinder by means of bolts 25 which are retained in adjusted position by nuts 26. The cutter-bar support or blade-holder 23 is provided with a longitudinal slot 27 within which is seated a cutter-bar 28, said cutter-bar being secured in position by suitable set screws 29. The cutter-bar 28 is provided with peripherally-spaced blades 30 provided with parallel cutting-edges 31 which have a peculiar form and arrangement with respect to their axis of revolution and with respect to the form and arrangement of the cutting-edges 17 of the blades 16 of the upper cylinder 7. By referring to Figures 9, 10, 11 and 12, the construction and arrangement of the slotting-blades 30 will be clearly understood. In Figure 9, a top plan view of the lower cutter-bar 28 is represented in full lines, the relative positions of the cutting-edges of the upper cutter-blades with respect thereto being represented by dot and dash lines. By an inspection of Figure 9, it will be seen that the cutting edges 17 are peripherally inclined with respect to the common plane of the axes of rotary shafts 1 and 2. By an inspection of Figures 10, 11 and 12, on the other hand, it will be seen that each cutting edge of the cutter-blades 30 on the lower cutter bar 28 diverges downwardly from the cutting-edge 17 of the corresponding cutter-blade 16 of the upper cutter-bar 14 from one end to the other of said cutter-bars. It will be understood, therefore, that the cutting-edges of the lower cutter-blades are in the form of spirals constructed on a decreasing radius from one end to the other of the lower cutter-bar. Hence, the cutting-edges 31 of the lower cutter-blades are inclined toward their axis of revolution from their highest points at one end of the cutter-bar to their lowest points at the other end of said cutter-bar while at the same time said cutting edges deviate angularly or peripherally from the radial planes which pass through the axis of the lower shaft 2 and include said highest points in the cutting edges of said lower blades 30. As shown best in Figure 3 of the drawings, the cutter-bar supports 11 and 23 are preferably constructed of the same radial thickness and mounted on the peripheries of cylinders of equal diameter. It will be seen, however, that the grooves or slots 13 and 27, as well as the cutter-bars 14 and 28, are made of different depths so that during equal angular movements of the upper and lower shafts 1 and 2, the cutting edges 17 of the upper cutter-bar will be moving at relatively lower velocity while the cutting edges 31 of the lower cutter-bar will be moving at relatively higher velocity. Furthermore, the cutting operation will take place entirely above the plane of feed of the blank 19 since the upper cutter-blades terminate above said feeding plane when their cutting edges pass said common plane of the axes. It will be understood from this description that during the approach of the upper and lower cutter-bars to the plane common to the rotary axes of upper and lower shafts 1 and 2, the high points of the cutting edges of the lower cutter bar will be brought into cutting relation to the cutting edges of the upper cutter bar, at one end after which the cutting action will continue from point to point along the length of said upper and lower cutter bars until the low points of the lower cutter bar are reached in said common plane of the shaft axes. At the same time, it will be seen that there will be a progressive radial and peripheral separation of the cooperating upper and lower cutter blades on one side of the active cutting points, while on the other side thereof said cooperating blades will be progressively approaching each other in radial and peripheral directions (see Figures 2, 10, 11 and 12).

Referring more especially to Figures 13, 15, 16 and 17, suitable end slot cutters may be provided as follows. For example, a rectangular block 32 of suitable width to fit into the slot or groove 27 in the lower cutter bar, may be secured in position by a set screw 33, as shown in Figure 15. Presented upwardly from one end of the block 32 is a wafer-like cutter 34 which is sharpened around its curved upper edge. Said cutter may be formed as an integral portion of the block 32, as shown in Figures 15 and 16, and in the event that the slot is to be made with a straight normal edge, the wafer-like cutter may be provided with a flat surface flush with the end wall of block 32. As shown best in Figure 15, the width of cutter 34 may be made slightly larger than the peripheral distance between the cutting edges 31 of the lower cutter bar, the highest point in the cutting edge of cutter 34 being disposed substantially midway between said cutting edges 31. In some cases, it may be desirable to mount the end slot-cutter directly upon the lower cutter bar, as shown in Figure 17. For this purpose, a small plate 35 may be secured to the end of lower cutter bar 28 by means of a countersunk screw 36, the upper end of said plate being provided with an upwardly-presented end-cutter 37 which may be similar in form to cutter 34. Referring again to Figure 3 of the drawings, it will be seen that the relative forward movement of the lower cutter bar 28 with respect to the upper cutter bar 14, will tend to impart an angular displacement of the chip 38 as it is cut from the blank. In order to make sure that the chip 38 does not become lodged between the cutter blades of either the upper or lower cutter bars 14 and 28, suitable chip-ejecting means may be provided such, for example, as the device shown in Figures 4, 11, 13 and 14. Thus, in the example illustrated, three ejectors may be arranged at suitable points along each of said cutter bars, namely, at the center and near opposite ends thereof. At these points in each of the cutter bars, suitable holes or sockets 39 may be drilled in the seated edges of said cutter bars. In the outer end of each of said holes, is threaded a plug 40. At the inner end of said hole 39, another hole of smaller diameter is drilled through the metal into the elongated space between the cutter blades 16, 16 (or 30, 30) for reciprocably mounting a plunger 41 which projects at one end into the inter-cutter space, as shown best in Figure 14. Said plunger is provided with a collar or flange 42 which is adapted to engage an annular shoulder 43 for limiting its outward displacement under the pressure of a compression spring 44 which is interposed between the collar or flange 42 and the plug 40. It will be understood from this description that as the chip 38 is cut from a blank and becomes angularly arranged, as shown in Figure 14, its opposite lateral edges will bear against the upper and lower plungers 41 which are moved inwardly against the pressure of springs 44. As the upper and lower cutter bars move forwardly and separate, the springs 44 react upon the chip 38, which is thus ejected from the separating cutter-blades.

As shown in Figures 20, 21, 22 and 23, various forms of slots may be cut in the blanks on a machine of this character, for which purpose, cutter blades and end-cutters of suitable form may be interchangeably mounted in the elongated slots 13 and 27 which are formed in the respective cutter bar supports 11 and 23.

Referring now to Figures 18 and 19 of the drawings, my invention is illustrated in an adaptation to a pair of cooperating single blades suitable for cutting off portions of a web or blank. According to this embodiment of my invention, a lower cutter-bar 45 may be suitably mounted to revolve about an axis into and out of cooperating relation with a second cutter-bar to be presently described. Presented outwardly from its axis of revolution along one edge of said cutter-bar, is a cutter-blade 46, which is progressively offset from one end to the other with respect to a radial plane through its axis of revolution. As shown in Figure 18, the cutter-blade 46 is provided with a cutting edge 47, which from one end to the other of said cutter-bar is inclined towards the axis of revolution so that by reason of the angular offset of the cutter-bar, above referred to, said cutting edge is in the form of a spiral constructed on a decreasing radius. Revolvable about another axis is an upper cutter-bar 48 which carries a cutter-blade 49 provided with a cutting edge 50, said cutting edge being parallel to its axis of revolution. The construction and arrangement of these parts is such that as the cutting edge 47 of the lower cutter-blades approaches the plane which is common to both axes of revolution, one end of it comes into cooperative action with the upper cutter-blade well above the plane of feed of a web 51. As the movement continues, said blades cooperate at successive points from one end to the other, and inasmuch as the lower spirally-formed cutting edge 47 is farther from its axis of revolution at every point in its length than the cutting edge 50 of the upper cutter-blade, the lower cutter-blade moves more rapidly than the upper cutter-blade so that it becomes increasingly separated from the latter as the point at which the blades cooperate travels from one end to the other.

I claim:—

1. In a device of the character described, the combination of two cutter blades revolvable about parallel axes into cooperation with each other as they approach the plane common to said axes, one of said cutter blades having a spiral cutting edge constructed on an increasing radius with respect to and from one end to the other of its axis of revolution.

2. In a device of the character described, the combination of two cutter blades revolvable about parallel axes into cooperation with each other as they approach the plane common to said axes, one of said cutter blades having its cutting edge lying farther from its axis of revolution than the other, the former cutter blade being provided with a spiral cutting edge having a relatively larger radius at one end than at the other end with respect to its axis of revolution.

3. In a device of the character described, the combination of two cutter blades revolvable about axes into and out of cooperation with each other, one of said blades being provided with a straight cutting edge parallel to its axis of revolution, and the other of said cutter blades being provided with a spiral cutting edge constructed on an increasing radius with respect to its axis of revolution.

4. In a device of the character described, the combination of two cutter blades revolvable about parallel axes into and out of cooperation with each other, one of said cutter blades being provided with a spiral cutting edge constructed on an increasing radius from one end to the other of said cutter blade and the other of said cutter blades being provided with a straight cutting edge parallel to its axis of revolution and having a radius of revolution less than the smallest radius of said spiral cutter blade.

5. In a blank-slotting machine, the combination of blank-slotting cutters revolvable about axes on opposite sides of the plane of feed of a blank, each of said blank-slotting cutters comprising peripherally-spaced blades adapted to cooperate with similar peripherally-spaced blades of the other of said blank-slotting cutters, the peripherally-spaced blades of one slotting cutter being provided with spiral cutting edges extending lengthwise of their common axis of revolution and increasing in radius from one end to the other thereof.

6. In a blank-slotting machine, the combination of rotary shafts journalled upon axes on opposite sides of the plane of feed of a blank, blank-slotting cutters mounted on said shafts and revolvable thereby, one of said blank-slotting cutters comprising peripherally-spaced blades having their cutting edges parallel to their axis of revolution and terminating short of the feed plane of said blank in the common plane of said axes, and the other of said blank-slotting cutters comprising peripherally-spaced blades projecting beyond the feed-plane of said web in the common plane of said axes and having spiral cutting edges approaching nearer to their common axis of revolution at one end than at the other end.

7. In a blank-slotting machine, the combination of rotary shafts journalled upon axes on opposite sides of the plane of feed of a blank, peripherally-spaced cutter blades mounted on each of said shafts and revolvable thereby, the peripherally-spaced blades on one of said shafts projecting beyond the feed-plane of said web in the common plane of said axes and having spiral cutting edges constructed on a reducing radius from one end to the other thereof.

8. In a blank-slotting machine, the combination of rotary shafts journalled upon axes on opposite sides of the plane of feed of a blank, blank-slotting cutters mounted on said shafts and revolvable thereby into cooperation with each other as they approach the common plane of said axes, one of said blank-slotting cutters comprising peripherally-spaced blades having their cutting edges parallel to their common axis of revolution, and the other of said blank-slotting cutters comprising peripherally-spaced blades provided with spiral cutting edges constructed on radii which vary in length from one end to the other thereof.

9. In blank-slotting mechanism, the combination with positively geared cylinders journalled upon parallel axes, of cutter-blades adjustable endwise along the axes of said cylinders, one of said cutter-blades being provided with spiral cutting edges constructed on increasing radii from one end to the other of said cutter-blades.

10. In blank-slotting mechanism, the combination with positively geared cylinders journalled upon parallel axes, of cutter-blade supports adjustable peripherally on said cylinders, said cutter-blade supports being provided with slots extending longitudinally of said cylinders, and a cutter-blade adjustable endwise in each of said slots, one of said cutter-blades being provided with a spiral cutting edge constructed on an increasing radius.

11. In blank-slotting mechanism, the combination with positively geared cylinders journalled on opposite sides of the plane of feed of a blank to be slotted, of cutter-blade supports mounted on said cylinders, and a double cutter-blade mounted in each of said cutter-blade supports and having peripherally-spaced cutting edges, the peripherally-spaced cutting edges of one of said double cutter-blades being constructed in spirals with radii decreasing from one end to the other of said cutting edges in respect to their common axis of revolution.

12. In blank-slotting mechanism, the combination with positively geared cylinders journalled upon parallel axes equidistant from the plane of feed of a blank to be slotted, of cutter-blade supports mounted on the peripheries of said cylinders, and double cutter-blades mounted in said cutter-blade supports and projecting different distances from the rotary axes of said cylinders, the cutting edges of one of said double cutter-blades being formed as spirals on a diminishing radius from one end to the other and receding from the radial planes through their respective axes of revolution including the largest radius of said cutting edges.

13. In blank-slotting mechanism, the combination with positively geared cylinders journalled upon parallel axes, of cutter-blade supports movable peripherally on said cylinders to different adjusted positions thereon, and cutter-blades adjustable endwise on said cutter-blade supports, one of said cutter-blades being provided with a spiral cutting edge constructed on an increasing radius from one end to the other of said cutter-blade.

14. In a blank-slotting machine, the combination of two rotary cylinders journalled upon axes arranged on opposite sides of the feeding plane of a blank to be slotted, said feeding plane intersecting the common axial plane of said cylinders in a line representing the line of tangency between cylindrical pitch-surfaces of said rotary cylinders, and blank-slotting blades mounted on said rotary cylinders, said blank-slotting blades being constructed and arranged to cooperate in blank slotting operations along lines inclined radially and peripherally with respect to said cylindrical pitch-surfaces.

15. In a blank-slotting machine, the combination of two rotary cylinders journalled upon axes arranged on opposite sides of the feeding plane of a blank to be slotted, said feeding plane intersecting the common axial plane of said cylinders in a line representing the line of tangency between the cylindrical pitch-surfaces of said rotary cylinders, double blank-slotting blades mounted on each of said rotary cylinders, the blank-slotting blades on one of said rotary cylinders having straight cutting edges terminating short of the pitch-surface for that cylinder and the blank-slotting blades carried by the other of said rotary cylinders having cutting edges projecting past and beyond the pitch-surface for said other rotary cylinder, the last-mentioned cutting edges being inclined radially and peripherally with respect to the intersection of said common axial plane and said feeding plane.

16. In a blank-slotting machine, the combination of two sets of blank-slotting blades revolvable around axes on opposite sides of a common blank-feeding plane, the revolution of said blank-slotting blades being adapted to move the cutting edges of each set into and out of overlapping positions with respect to the cutting edges of the other set, and means yieldably mounted between the blank-slotting blades of each set and nearer to the cutting edge of the forward blade than to the cutting edge of the rearward blade for engaging the opposite lateral edges of chips cut from the blanks by said blank-slotting blades and thereby ejecting said chips from between the cooperating blank-slotting blades.

17. In a blank-slotting machine, the combination of two sets of blank-slotting blades revolvable around axes on opposite sides of a common blank-feeding plane, and means yieldably mounted between the blank-slotting blades of each set for ejecting the chips cut from the blanks by said blank-slotting blades, the chip-ejecting means of one set of said blank-slotting blades being peripherally offset with respect to the chip-ejecting means of the other set of said blank-slotting blades for movably engaging the opposite lateral edges of the severed chips.

18. In a blank-slotting machine, the combination of two rotary cylinders journalled upon axes arranged on opposite sides of a blank-feeding plane, a slotter-blade support mounted on each of said cylinders, peripherally-spaced blank-slotting blades mounted in each of said slotter-blade supports, the blank-slotting blades on one of said cylinders being peripherally offset with respect to the blank-slotting blades on the other of said cylinders in the cooperative positions of said blank-slotting blades, and resiliently-mounted plungers arranged between the peripherally-spaced blank-slotting blades on each cylinder.

19. In a device of the character described, the combination of two sets of blank-slotting blades revolvable about parallel axes into and out of slot-cutting cooperation as they approach the plane common to said axes, one set of said blades being provided with straight cutting edges lying within a cylindrical surface of revolution having a relatively small radius and the other set of said cutter-blades being provided with spiral cutting edges each of which is inclined from a relatively larger radius at one end to a relatively smaller radius at the other end, and a series of yieldably mounted chip-ejecting plungers reciprocable between the slot-cutting blades of each set.

GEORGE W. SWIFT, Jr.